US008432335B2

(12) United States Patent
Kim

(10) Patent No.: US 8,432,335 B2
(45) Date of Patent: Apr. 30, 2013

(54) ORGANIC LIGHT EMITTING DISPLAY DEVICE

(75) Inventor: Yang-Wan Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 227 days.

(21) Appl. No.: 12/869,618

(22) Filed: Aug. 26, 2010

(65) Prior Publication Data

US 2011/0164015 A1 Jul. 7, 2011

(30) Foreign Application Priority Data

Jan. 5, 2010 (KR) ........................ 10-2010-0000402

(51) Int. Cl.
*G09G 3/30* (2006.01)
*G06F 3/038* (2006.01)

(52) U.S. Cl.
USPC ............................................ 345/76; 345/211

(58) Field of Classification Search .................. 345/211, 345/45, 46, 36, 39, 76–82; 313/483
See application file for complete search history.

(56) References Cited

U.S. PATENT DOCUMENTS

2006/0151745 A1* 7/2006 Kim et al. ................ 252/301.16

FOREIGN PATENT DOCUMENTS

KR 10-0796136 1/2008
KR 10-2008-0067489 7/2008

OTHER PUBLICATIONS

KIPO Office Action dated Sep. 29, 2011, for Korean Priority Patent Application No. 10-2010-0000402, citing the reference in this IDS, as well as KR 10-2008-0067489 cited in an IDS dated Aug. 26, 2010, 1 page.

* cited by examiner

*Primary Examiner* — Kent Chang
*Assistant Examiner* — Scott Au
(74) *Attorney, Agent, or Firm* — Christie, Parker & Hale, LLP

(57) ABSTRACT

An organic light emitting display device for transmitting data using demultiplexers is provided. The organic light emitting display device includes: a demultiplexer controller for sequentially supplying control signals during a first period of a horizontal period; scan lines for transferring a scan signal; a scan driving unit for supplying the scan signal to the scan lines during a second period of the horizontal period; output lines for transferring data signals; a data driving unit for sequentially supplying the data signals to respective output lines during the first period; data lines for transferring the data signals; demultiplexers coupled to the respective output lines, for delivering the data signals to the data lines in response to the control signals; an initializing unit coupled to the data lines and an initial power source; and pixels located at crossing regions of the scan lines and the data lines.

14 Claims, 5 Drawing Sheets

ORGANIC LIGHT EMITTING DISPLAY DEVICE

CROSS-REFERENCE TO RELATED APPLICATION

This application claims priority to and the benefit of Korean Patent Application No. 10-2010-0000402, filed in the Korean Intellectual Property Office on Jan. 5, 2010, the entire content of which is incorporated herein by reference.

BACKGROUND

1. Field

Aspects of embodiments according to the present invention relate to an organic light emitting display device, and more particularly, to an organic light emitting display device that uses a demultiplexer.

2. Description of the Related Art

Recently, various thin and lightweight flat panel display devices (when compared to cathode ray tube devices) have been developed. There are various flat panel display devices such as liquid crystal displays (LCDs), field emission displays (FEDs), plasma display panels (PDPs), and organic light emitting display devices.

Organic light emitting display devices display images using organic light emitting diodes for emitting light when electrons and holes are re-combined, and have a rapid response and low power consumption. An organic light emitting display device includes a plurality of pixels arranged at crossing regions of data lines and scan lines, a data driving unit for supplying data signals to the data lines, and a scan driving unit for supplying scan signals to the scan lines.

The scan driving unit sequentially supplies the scan signals to the scan lines. The data driving unit supplies the data signals to the data lines in synchronization with the scan signals. The pixels are selected when the scan signals are supplied to the scan lines, at which point the selected pixels receive the data signals from the data lines. The pixels display images (e.g., predetermined images) by supplying current corresponding to the received data signals to the organic light emitting diodes.

SUMMARY

Accordingly, aspects of embodiments according to the present invention provide for an organic light emitting display device for transmitting data from the data driving unit to the data lines using demultiplexers regardless of the supply time of the data signals.

In an exemplary embodiment according to the present invention, an organic light emitting display device is provided. The organic light emitting display device includes a demultiplexer controller, a plurality of scan lines, a scan driving unit, a plurality of output lines for transferring a plurality of data signals, a data driving unit, a plurality of data lines, a plurality of demultiplexers, an initializing unit, and a plurality of pixels. The demultiplexer controller is for sequentially supplying i (i is a natural number greater than 2) control signals during a first period of a horizontal period. The scan lines are for transferring a scan signal. The scan driving unit is for supplying the scan signal to the scan lines during a second period of the horizontal period. The output lines are for transferring a plurality of data signals. The data driving unit is for sequentially supplying i of the data signals to respective output lines during the first period. The demultiplexers are coupled to the respective output lines. The demultiplexers are for delivering the i of the data signals to a respective i of the data lines in response to the i control signals. The initializing unit is coupled to the data lines and an initial power source. The initializing unit is for supplying a voltage of the initial power source to the data lines during a third sub-period of the second period. The pixels are located at crossing regions of the scan lines and the data lines. The pixels are configured to be driven by receiving the data signals and the scan signal during a second sub-period of the second period, and by receiving the voltage of the initial power source during the third sub-period.

The voltage of the initial power source may be set to a same voltage as or a voltage lower than a lowest voltage of the data signals.

The display device may further include data capacitors formed in the data lines for storing the data signals supplied to the data lines during the first period.

The initializing unit may further be for supplying the voltage of the initial power source after the data signals stored in the data capacitors during the first period are supplied to the pixels.

The initializing unit may include a switching device coupled between the data lines and the initial power source.

The initializing unit may further include a plurality of switching devices coupled between the data lines and the initial power source.

The initializing unit may still further include a respective plurality of switching devices coupled between the data lines and the initial power source.

Each of the second periods may be divided into a first sub-period, the second sub-period, and the third sub-period, and the switching device may be configured to turn on during the third sub-period.

The display device may further include a plurality of light emitting control lines substantially parallel to the scan lines, for transferring a light emitting control signal supplied by the scan driving unit to the pixels. Each of the pixels may include an organic light emitting diode, a second transistor, a third transistor, a first transistor, a first capacitor, and a second capacitor. The second transistor is coupled between a first power source and the organic light emitting diode, for controlling an amount of current supplied from the first power source to the organic light emitting diode. The third transistor is coupled between a first electrode of the second transistor and the first power source, and for turning off when the light emitting control signal is supplied. The first transistor is coupled between a gate electrode of the second transistor and one of the data lines, and for turning on when the scan signal is supplied. The first capacitor is coupled between the gate electrode and the first electrode of the second transistor. The second capacitor is coupled between the first electrode of the second transistor and the first power source.

The second capacitor may be configured to have a capacitance two to ten times a capacitance of the first capacitor.

The second period may be divided into a first sub-period, a second sub-period, and a third sub-period. The scan driving unit may be further for supplying the light emitting control signal during the second sub-period and the third sub-period, but not the first sub-period.

Each of the demultiplexers may include i switching devices that are coupled to the respective i of the data lines.

The i switching devices may be sequentially turned on by the i control signals.

In another exemplary embodiment according to the present invention, an organic light emitting display device is provided. The organic light emitting display device includes a demultiplexer controller, a plurality of scan lines, a scan driving unit, a plurality of output lines, a data driving unit, a plurality of data lines for transferring the data signals, a plurality of demultiplexers, an initializing unit, and a plurality of pixels. The demultiplexer controller is for sequentially supplying i (i is a natural number greater than 2) control signals during respective first periods of a plurality of horizontal periods. The scan lines are for transferring a plurality of scan signals. The scan driving unit is for supplying the scan signals to the scan lines during respective second periods of the horizontal periods. The output lines are for transferring a plurality of data signals. The data driving unit is for sequentially supplying i of the data signals to respective output lines during the first periods. The demultiplexers are coupled to the respective output lines, and for delivering the i of the data signals to a respective i of the data lines in response to the i control signals. The initializing unit is coupled to the data lines and an initial power source. The initializing unit is for supplying a voltage of the initial power source to the data lines during respective third sub-periods of the second periods. The pixels are located at crossing regions of the scan lines and the data lines. Each of the pixels is configured to be driven during one of the horizontal periods by receiving one of the data signals and one of the scan signals during one of respective second sub-periods of the second periods, and by receiving the voltage of the initial power source during one of the third sub-periods.

According to embodiments of the organic light emitting display device of the present invention, the data signals are supplied to the data lines using the demultiplexers, and a voltage of an initial power source is supplied to the data lines using an initializing unit. In this case, the voltage of the initial power source may be supplied to the data lines at a desired time regardless of the use of the demultiplexers or when the data signals are applied to various pixels.

BRIEF DESCRIPTION OF THE DRAWINGS

The accompanying drawings, together with the specification, illustrate exemplary embodiments of the present invention, and, together with the description, serve to explain the principles of embodiments of the present invention.

DETAILED DESCRIPTION

Figure 1:
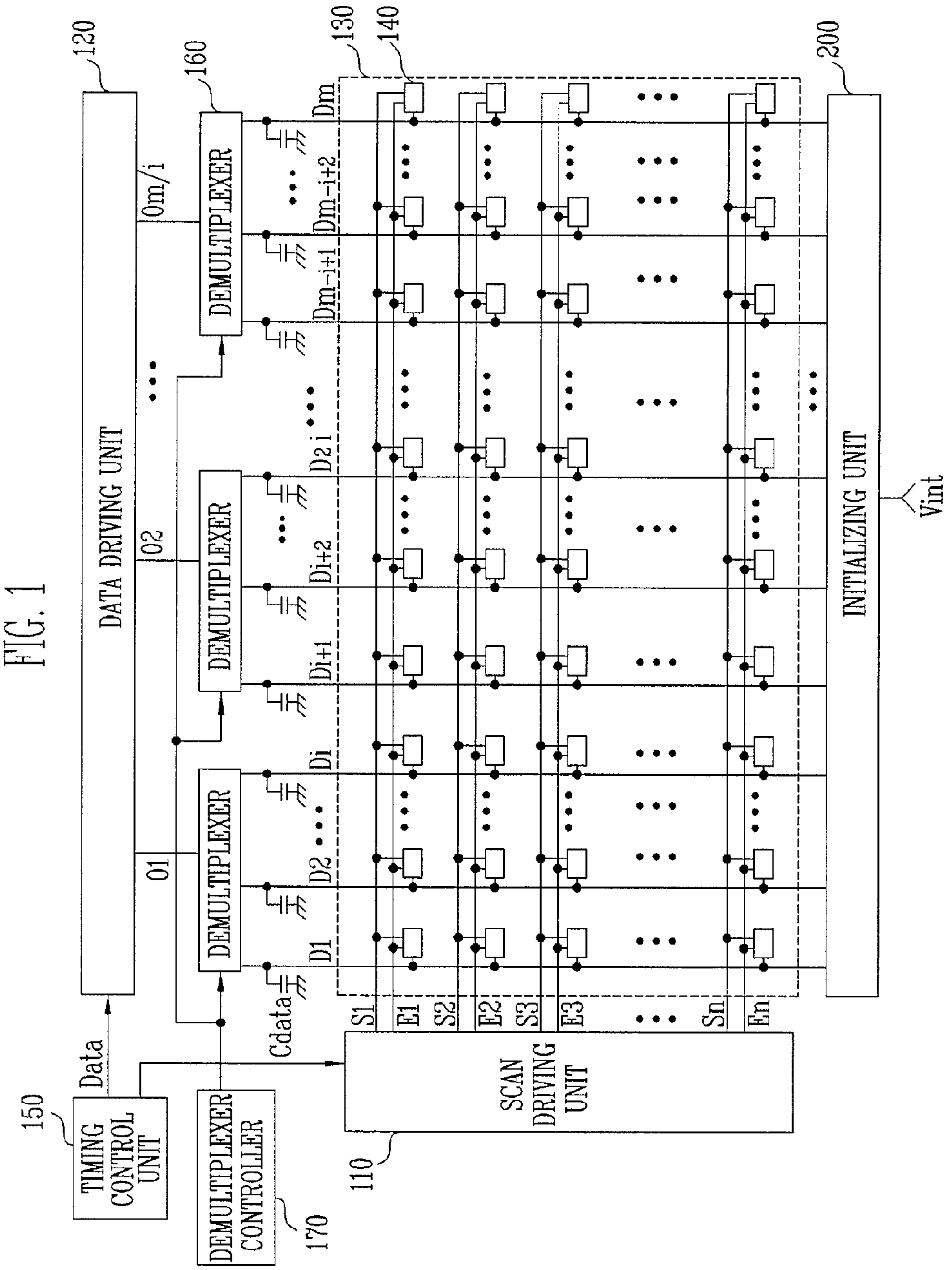
FIG. 1 is a view illustrating an organic light emitting display device according to an embodiment of the present invention.

Hereinafter, certain exemplary embodiments according to the present invention will be described with reference to the accompanying drawings. Here, when a first element is described as being "coupled" to a second element, the first element may be not only directly coupled (e.g., connected) to the second element but may also be indirectly coupled (e.g., electrically connected) to the second element via one or more third elements. In addition, the same reference numeral may sometimes refer to a signal line or to a signal transferred along the signal line, with the appropriate meaning apparent from context. Further, some of the elements that are not essential to the complete understanding of the disclosed embodiments of the invention are omitted for clarity. Also, like reference numerals refer to like elements throughout.

Hereinafter, the disclosed embodiments of the present invention will be described such that those skilled in the art can easily practice the present invention in detail with reference to FIGS. 1 to 8.

In an organic light emitting display device, demultiplexers may be installed between the data driving unit and the data lines. Each demultiplexer delivers i (i is a natural number greater than two) data signals that are output from respective channels of the data driving unit to i respective data lines. The data signals output from the demultiplexer are stored in respective parasitic capacitors of the data lines and are supplied to the pixels when the scan signal is supplied.

In order to lower the number of transistors included in the pixels, a method of varying voltages of the data lines when the scan signal is supplied has been proposed. In this case, the pixels receive voltages of the data lines varying during the supply of the scan signal in order to compensate for the threshold voltages of the driving transistors. However, when the voltages of the data lines vary during the supply of the scan signal, the demultiplexers cannot be used. In other words, since the voltage of the data signal is charged to the respective parasitic capacitors of the data lines in advance of when the demultiplexers are used, it is difficult to vary the voltages of the data lines for a period when the scan signal is supplied.

FIG. 1 is a view illustrating an organic light emitting display device according to an embodiment of the present invention that addresses the above problem.

Referring to FIG. 1, the organic light emitting display device includes a scan driving unit 110, a data driving unit 120, a display unit 130, a timing control unit 150, demultiplexers 160, a demultiplexer controller 170, and an initializing unit 200.

The display unit 130 includes a plurality of pixels 140 positioned at crossing regions of the scan lines S1 to Sn and the data lines D1 to Dm. The pixels 140 are selected when the scan signals are supplied to the scan lines S1 to Sn and receive the data signals and a voltage of an initial power source Vint from the data lines D1 to Dm. The pixels 140 that received the data signals and the voltage of the initial power source Vint generate light of a particular brightness (e.g., a predetermined brightness) in response to voltage differences between the data signals and the voltage of the initial power source Vint.

The scan driving unit 110 generates scan signals and supplies the generated scan signals to the scan lines S1 to Sn sequentially during respective horizontal periods 1H, each scan signal supplied during a second period of a respective horizontal period 1H, which is divided into a first period and the second period. In addition, the scan driving unit 110 generates light emitting control signals and supplies the generated light emitting control signals to light emitting control lines E1 to En sequentially, where the light emitting control lines E1 to En are substantially parallel to the scan lines S1 to Sn. A light emitting control signal to be supplied to a jth (j is a natural number) light emitting control line Ej is partially overlapped with a scan signal supplied to a jth scan line Sj. The scan signal is set to a voltage (for example, a low voltage)

where the transistors included in the pixel are turned on, and to a voltage (for example, a high voltage) where the transistors included in the pixel are turned off.

The data driving unit 120 supplies i data signals to each of output lines O1 to Om/i sequentially during the first period of the horizontal period 1H.

The demultiplexers 160 are coupled to the respective output lines O1 to Om/i. Each demultiplexer 160 supplies i data signals—that are supplied to a corresponding one of the output lines O1 to Om/i—to i respective data lines D. In this case, the number of the output lines of the data driving unit 120 may be reduced from the case of one output line per data line and therefore, manufacturing costs may be saved.

The data signals, supplied from the demultiplexers 160 to the data lines D, are stored in data capacitors Cdata as parasitic capacitors of the data lines. The data signals stored in the data capacitors Cdata are supplied to the pixels 140 during the second period of the horizontal period 1H (i.e., when the scan signal is supplied).

The demultiplexer controller 170 supplies i control signals to each of the demultiplexers 160 for the first period of the horizontal period 1H. At this time, each of the demultiplexers 160 supplies i data signals—that are supplied to a corresponding one of the output lines O—to i data lines D in response to the i respective control signals. Although FIG. 1 shows the demultiplexer controller 170 installed outside the timing controller 150 for the convenience of description, the present invention is not limited thereto. For example, the demultiplexer controller 170 may be installed in the timing controller 150.

The initializing unit 200 is coupled between the data lines D1 to Dm and the initial power source Vint. The initializing unit 200 receives a reset signal (not shown) for some of the second period of the horizontal period 1H and supplies a voltage of the initial power source Vint to the data lines D1 to Dm during the supply of the reset signal. To this end, the initializing unit 200 includes at least one switching device. A voltage of the initializing unit 200 (namely, that of the initial power source Vint) is set to the same voltage as or a voltage lower than the lowest of the voltages of the data signals supplied to the data lines D1 to Dm.

The timing control unit 150 controls the scan driving unit 110 and the data driving unit 120. The timing control unit 150 arranges data Data supplied from the exterior and transmits the same to the data driving unit 120.

Figure 2:
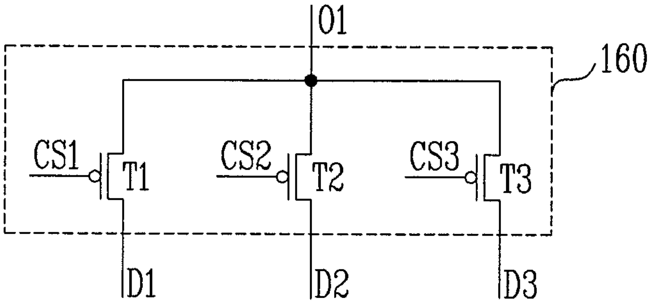
FIG. 2 is a view illustrating an embodiment of the demultiplexer of FIG. 1.

FIG. 2 is a view illustrating an embodiment of the demultiplexer of FIG. 1. Without loss of generality, FIG. 2 shows a demultiplexer 160 coupled to the first output line O1, and the number i is assumed to be three.

Referring to FIG. 2, the demultiplexer 160 includes i switching devices T1 to T3 that are coupled between the first output line O1 and the data lines D1 to D3, respectively.

The first switching device T1 is formed between the first output line O1 and the first data line D1. The first switching device T1 is turned on when a first control signal CS1 is supplied from the demultiplexer controller 170.

The second switching device T2 is formed between the first output line O1 and the second data line D2. The second switching device T2 is turned on when a second control signal CS2 is supplied from the demultiplexer controller 170.

The third switching device T3 is formed between the first output line O1 and the third data line D3. The third switching device T3 is turned on when a third control signal CS3 is supplied from the demultiplexer controller 170.

Figure 3:
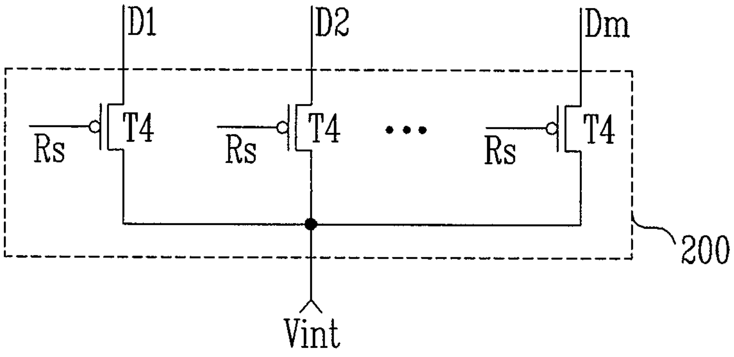
FIG. 3 is a view illustrating a first embodiment of the initializing unit of FIG. 1.
Figure 4:
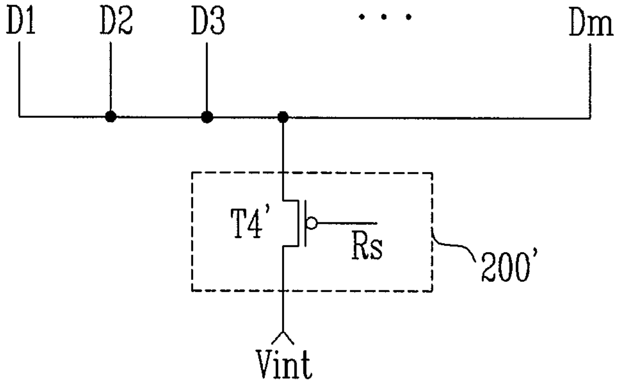
FIG. 4 is a view illustrating a second embodiment of the initializing unit of FIG. 1.

FIGS. 3 and 4 are views illustrating a first embodiment and a second embodiment of the initializing unit of FIG. 1.

Referring to FIG. 3, the initializing unit 200 includes fourth switching devices T4 coupled between the respective data lines D1 to Dm and the initial power source Vint. The fourth switching devices T4 are turned on when a reset signal Rs is supplied, and supply the voltage of the initial power source Vint to the respective data lines D1 to Dm.

Although FIG. 3 shows the fourth switching devices T4 coupled to the respective data lines D1 to Dm, the present invention is not limited thereto. For example, the initializing unit 200', as illustrated in FIG. 4, may include only one fourth switching device T4' between the data lines D1 to Dm and the initial power source Vint.

Figure 5:
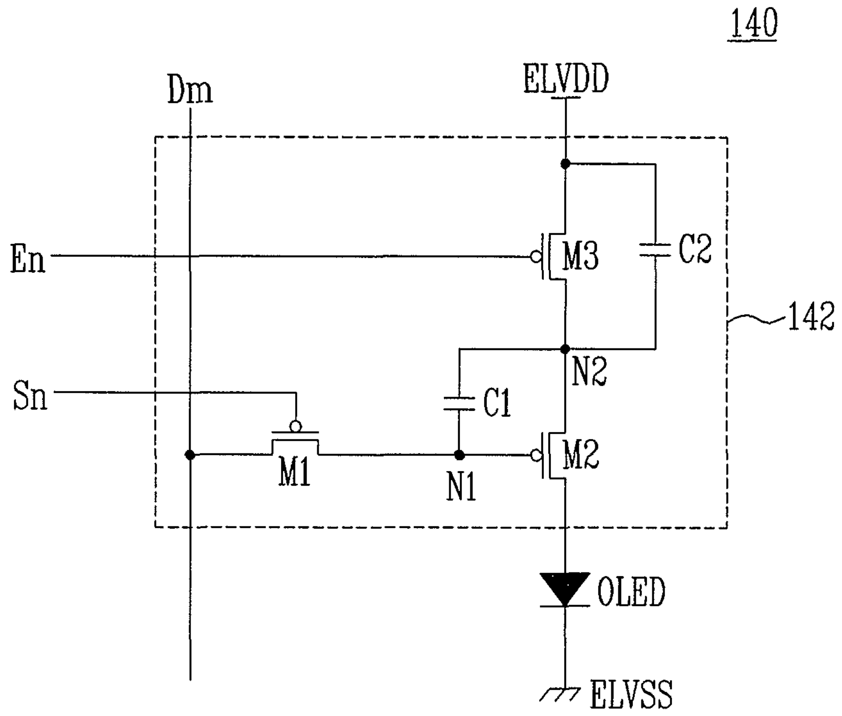
FIG. 5 is a view illustrating an embodiment of the pixel of FIG. 1.
Figure 6:
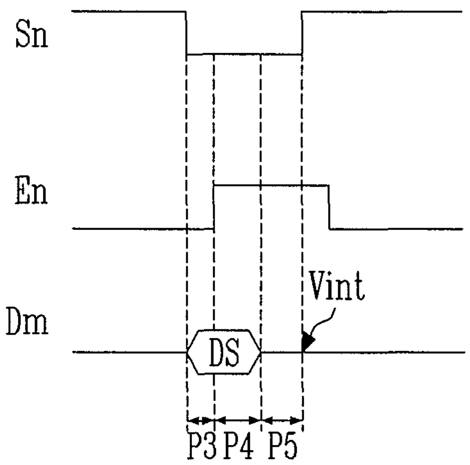
FIG. 6 is a waveform chart illustrating a driving method of the pixel of FIG. 5.

FIG. 5 is a view illustrating an embodiment of the pixel of FIG. 1, while FIG. 6 illustrates an example driving method of the pixel of FIG. 5. For the convenience of description, FIG. 5 shows a pixel 140 coupled to an nth scan line Sn and an mth data line Dm.

Referring to FIG. 5, the pixel 140 includes an organic light emitting diode OLED and a pixel circuit 142 coupled to the data line Dm and the scan line Sn, for controlling the amount of current supplied to the OLED.

An anode electrode of the OLED is coupled to the pixel circuit 142 and a cathode electrode of the OLED is coupled to a second power source ELVSS. The OLED generates light of a particular brightness (e.g., a predetermined brightness) in response to current supplied from the pixel circuit 142. The second power source ELVSS is set to a voltage lower than that of a first power source ELVDD.

The pixel circuit 142 controls the amount of current supplied to the OLED in response to a data signal supplied to the data line Dm when the scan signal is supplied to the scan line Sn. To this end, the pixel circuit 142 includes first to third transistors M1 to M3, a first capacitor C1, and a second capacitor C2.

A first electrode of the first transistor M1 is coupled to the data line Dm and a second electrode of the first transistor M1 is coupled to a first node N1 (that is, a gate electrode of the second transistor M2). A gate electrode of the first transistor M1 is coupled to the scan line Sn. The first transistor M1 is turned on when the scan signal is supplied to the scan line Sn, and supplies the data signal or the voltage of the initial power source Vint (that is supplied to the data line Dm) to the first node N1.

A first electrode of the second transistor M2 is coupled to a second node N2 (that is, a second electrode of the third transistor M3) and a second electrode of the second transistor M2 is coupled to the anode electrode of the OLED. The gate electrode of the second transistor M2 is coupled to the first node N1. The second transistor M2 supplies current to the OLED corresponding to a voltage that is applied to the first node N1.

A first electrode of the third transistor M3 is coupled to the first power source ELVDD and the second electrode of the third transistor M3 is coupled to the second node N2. A gate electrode of the third transistor M3 is coupled to the light emitting control line En. The third transistor M3 is turned off when the light emitting control signal is supplied to the light emitting control line En, and is turned on when the light emitting control signal is not supplied.

The first capacitor C1 is coupled between the first node N1 and the second node N2. The first capacitor C1 stores a voltage corresponding to the data signal and a threshold voltage of the second transistor M2.

The second capacitor C2 is coupled between the first power source ELVDD and the second node N2. The second capacitor C2 maintains a stable voltage of the second node N2. To this end, the second capacitor C2 has a capacitance larger than that of the first capacitor C1. For example, the second capacitor C2 has two to ten times the capacitance of the first capacitor C1.

Operation of the pixel 140 will be described in detail with reference to the waveform chart of FIG. 6. First, when the scan signal is supplied to the scan line Sn, the first transistor M1 is turned on. The data signal DS is supplied to the data line Dm for a third period P3 of the second period P2 (where the scan signal is supplied to the scan line Sn). It should be noted that the second period P2 is divided into three sub-periods, including the third period P3, a fourth period P4, and a fifth period P5. The data signal DS is set to a voltage lower than that of the first power source ELVDD.

The data signal DS that is supplied to the data line Dm for the third period P3 is supplied to the first node N1 via the first transistor M1. During the third period P3, the light emitting control signal is not supplied to the light emitting control line En, so the third transistor M3 remains on. Since the third transistor M3 maintains the turn-on state for the third period P3, the second node N2 maintains the voltage of the first power source ELVDD. Here, since the data signal DS is set to a voltage lower than that of the first power source ELVDD, the second transistor M2 is turned on.

When the light emitting control signal is supplied to the light emitting control line En for the fourth period P4, the third transistor M3 is turned off. The data signal DS is still supplied to the data line Dm for the fourth period P4. When the third transistor M3 is turned off, the second transistor M2 maintains the turn-on state at an initial portion of the fourth period P4. When the voltage difference between the second node N2 and the first node N1 reaches the threshold voltage of the second transistor M2, however, the second transistor M2 is turned off. That is, a voltage corresponding to the threshold voltage of the second transistor M2 is charged to the first capacitor C1 during the fourth period P4.

The voltage of the initial power source Vint is supplied to the data line Dm for the fifth period P5. The voltage of the initial power source Vint supplied to the data line Dm for the fifth period P5 is supplied to the first node N1 via the first transistor M1. When the initial power source Vint is supplied to the first node N1, the voltage of the first node N1 is lowered from the voltage of the data signal DS to the voltage of the initial power source Vint. At this time, the second node N2 maintains the voltage applied for the fourth period P4. Then, the voltage corresponding to the threshold voltage of the second transistor M2 and the data signal is charged to the first capacitor C1. In detail, the second capacitor C2 is set to have a capacitance larger than that of the first capacitor C1. Therefore, the voltage of the second node N2 maintains the voltage applied during the fourth period P4 even when the voltage of the first node N1 varies.

After the fifth period P5, the supply of the scan signal to the scan line Sn is stopped and the first transistor M1 is turned off. When the first transistor M1 is turned off, the first node N1 is set to a floating state. After turning the first transistor M1 off, the supply of the light emitting control signal to the light emitting control line En is stopped and the third transistor M3 is turned on. When the third transistor M3 is turned on, the second transistor M2 supplies current corresponding to the voltage applied to the first node N1 to the OLED.

While the third transistor M3 is turned on, the voltage of the first power source ELVDD is supplied to the second node N2. At this time, the voltage of the first node N1, which is set to the floating state, rises in response to the voltage rise portion of the second node N2. That is, the voltage charged to the first capacitor C1 maintains the voltage charged for the previous period even when the third transistor M3 is turned on.

Since the first node N1 is set to the floating state when the voltage of the first power source ELVDD is supplied to the second node N2, it is possible to compensate for the voltage drop of the first power source ELVDD generated in response to the position of the pixel 140 in display unit 130. In other words, since the voltage of the first node N1 rises in response to the voltage rise portion of the second node N2, an image of a desired brightness is displayed regardless of the voltage drop of the first power source ELVDD.

Figure 7:
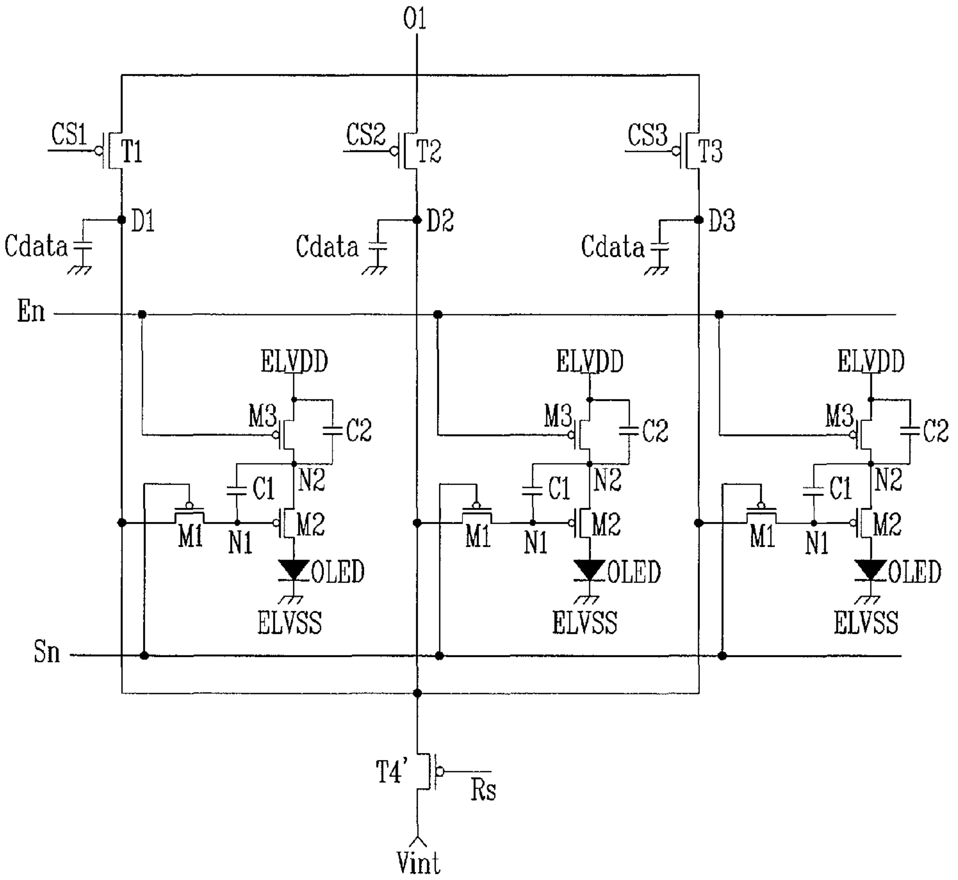
FIG. 7 is a view illustrating a connection structure among the demultiplexer, the initializing unit, and the pixels of FIG. 1.
Figure 8:
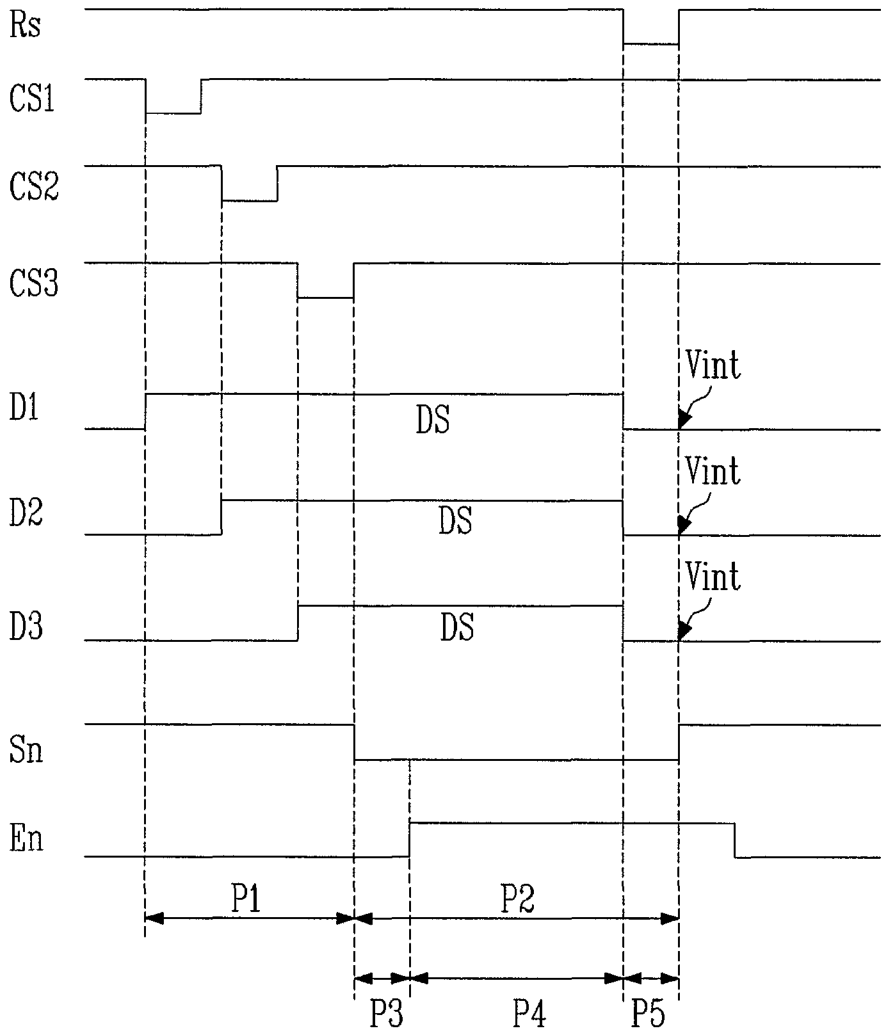
FIG. 8 is a waveform chart illustrating a driving method of the demultiplexer, the initializing unit, and the pixels of FIG. 7.

FIG. 7 is a view illustrating a connection structure among the demultiplexer, the initializing unit, and the pixels. FIG. 8 is a waveform chart illustrating a driving method of the demultiplexer, the initializing unit, and the pixels of FIG. 7.

Referring to FIGS. 7 and 8, as the first to third control signals CS1 to CS3 are sequentially supplied for the first period P1 of the horizontal period, the first switching device T1 to the third switching device T3 are sequentially turned on.

When the first switching device T1 is turned on, the data signal supplied to the first output line O1 is supplied to the first data line D1 via the first switching device T1. At this time, the voltage corresponding to the data signal is charged to the data capacitor Cdata of the first data line D1.

When the second switching device T2 is turned on, the data signal supplied to the first output line O1 is supplied to the second data line D2 via the second switching device T2. At this time, the voltage corresponding to the data signal is charged to the data capacitor Cdata of the second data line D2.

When the third switching device T3 is turned on, the data signal supplied to the first output line O1 is supplied to the third data line D3 via the third switching device T3. At this time, the voltage corresponding to the data signal is charged to the data capacitor Cdata of the third data line D3.

The scan signal is supplied to the scan line Sn for the second period P2. Here, the second period P2 of the horizontal period, that is, the period where the scan signal is supplied, as illustrated in FIG. 7, is divided into the third period P3 to the fifth period P5.

When the scan signal is supplied to the scan line Sn, the first transistors M1 included in the respective pixels 140 are turned on. When the first transistors M1 are turned on, the data signals charged to the data capacitors Cdata are supplied to the first nodes N1 of the respective pixels 140.

After that, during the fourth period P4, the light emitting control signal is supplied to the light emitting control line En and the third transistor M3 is turned off. When the third transistor M3 is turned off, the voltage corresponding to the threshold voltage of the second transistor M2 is charged to the first capacitor C1.

After the voltage corresponding to the threshold voltage of the second transistor M2 is charged to the first capacitor C1, in the fifth period P5, a reset signal Rs is supplied. When the reset signal Rs is supplied, a transistor T4' included in the initializing unit 200 is turned on and therefore, the initial power source Vint is supplied to the data lines D1 to D3. The initial power source supplied to the data lines D1 to D3 is supplied to the first node N1 via the first transistor M1. At this time, the first capacitor C1 charges the voltage corresponding to the threshold voltage of the second transistor M2 and the data signal.

After that (that is, at some point after fifth period P5), the supply of the light emitting control signal to the light emitting control line En is stopped, and the third transistor M3 is turned on. When the third transistor M3 is turned on, the second transistor M2 controls the OLED to emit light of a desired brightness while supplying current to the OLED corresponding to the voltage applied to the first node N1.

As described above, in embodiments of the present invention, the data signals are supplied using the demultiplexers 160, and a voltage of the initial power source Vint is supplied to the data lines D1 to Dm using the initializing unit 200. In this manner, voltages of the data lines D1 to Dm may be changed while the scan signal is supplied. That is, in embodiments of the present invention, the demultiplexers may be realized together with the pixels in which the voltages of the data signals vary when the scan signals are supplied, and therefore manufacturing costs may be saved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
a demultiplexer controller for sequentially supplying i (i is a natural number greater than 2) control signals during a first period of a horizontal period and before a second period of the horizontal period;
a plurality of scan lines for transferring a scan signal;
a scan driving unit for supplying the scan signal to the scan lines during the second period of the horizontal period;
a plurality of output lines for transferring a plurality of data signals;
a data driving unit for sequentially supplying i of the data signals to respective output lines during the first period;
a plurality of data lines for transferring the data signals;
a plurality of demultiplexers coupled to the respective output lines, for delivering the i of the data signals to a respective i of the data lines in response to the i control signals;
an initializing unit coupled to the data lines and an initial power source, for supplying a voltage of the initial power source to the data lines during a third sub-period of the second period; and
a plurality of pixels located at crossing regions of the scan lines and the data lines and configured to be driven by receiving the data signals and the scan signal during a second sub-period of the second period, and by receiving the voltage of the initial power source during the third sub-period.

2. The display device of claim 1, wherein the voltage of the initial power source is set to a same voltage as or a voltage lower than a lowest voltage of the data signals.

3. The display device of claim 1, further comprising data capacitors formed in the data lines for storing the data signals supplied to the data lines during the first period.

4. The display device of claim 3, wherein the initializing unit is further for supplying the voltage of the initial power source after the data signals stored in the data capacitors during the first period are supplied to the pixels.

5. The display device of claim 4, wherein the initializing unit comprises a switching device coupled between the data lines and the initial power source.

6. The display device of claim 5, wherein the initializing unit further comprises a plurality of switching devices coupled between the data lines and the initial power source.

7. The display device of claim 6, wherein the initializing unit further comprises a respective plurality of switching devices coupled between the data lines and the initial power source.

8. An organic light emitting display device comprising:
a demultiplexer controller for sequentially supplying i (i is a natural number greater than 2) control signals during a first period of a horizontal period;
a plurality of scan lines for transferring a scan signal;
a scan driving unit for supplying the scan signal to the scan lines during a second period of the horizontal period;
a plurality of output lines for transferring a plurality of data signals,
a data driving unit for sequentially supplying i of the data signals to respective output lines during the first period;
a plurality of data lines for transferring the data signals;
a plurality of demultiplexers coupled to the respective output lines, for delivering the i of the data signals to a respective i of the data lines in response to the i control signals;
an initializing unit coupled to the data lines and an initial power source, for supplying a voltage of the initial power source to the data lines during a third sub-period of the second period;
a plurality of pixels located at crossing regions of the scan lines and the data lines and configured to be driven by receiving the data signals and the scan signal during a second sub-period of the second period, and by receiving the voltage of the initial power source during the third sub-period; and
data capacitors formed in the data lines for storing the data signals supplied to the data lines during the first period,
wherein the initializing unit comprises a switching device coupled between the data lines and the initial power source, and
wherein the second period is divided into a first sub-period, the second sub-period, and the third sub-period, and the switching device is configured to turn on during the third sub-period.

9. An organic light emitting display device comprising:
a demultiplexer controller for sequentially supplying i (i is a natural number greater than 2) control signals during a first period of a horizontal period;
a plurality of scan lines for transferring a scan signal;
a scan driving unit for supplying the scan signal to the scan lines during a second period of the horizontal period;
a plurality of output lines for transferring a plurality of data signals;
a data driving unit for sequentially supplying i of the data signals to respective output lines during the first period;
a plurality of data lines for transferring the data signals;
a plurality of demultiplexers coupled to the respective output lines, for delivering the i of the data signals to a respective i of the data lines in response to the i control signals;
an initializing unit coupled to the data lines and an initial power source, for supplying a voltage of the initial power source to the data lines during a third sub-period of the second period;
a plurality of pixels located at crossing regions of the scan lines and the data lines and configured to be driven by receiving the data signals and the scan signal during a second sub-period of the second period, and by receiving the voltage of the initial power source during the third sub-period; and
a plurality of light emitting control lines substantially parallel to the scan lines, for transferring a light emitting control signal supplied by the scan driving unit to the pixels, wherein each of the pixels comprises:

an organic light emitting diode;

a second transistor coupled between a first power source and the organic light emitting diode, for controlling an amount of current supplied from the first power source to the organic light emitting diode;

a third transistor coupled between a first electrode of the second transistor and the first power source, and for turning off when the light emitting control signal is supplied;

a first transistor coupled between a gate electrode of the second transistor and one of the data lines, and for turning on when the scan signal is supplied;

a first capacitor coupled between the gate electrode and the first electrode of the second transistor; and a second capacitor coupled between the first electrode of the second transistor and the first power source.

10. The display device of claim 9, wherein the second capacitor is configured to have a capacitance two to ten times a capacitance of the first capacitor.

11. The display device of claim 9, wherein the second period is divided into a first sub-period, the second sub-period, and the third sub-period, and the scan driving unit is further for supplying the light emitting control signal during the second sub-period and the third sub-period, but not the first sub-period.

12. The display device of claim 1, wherein each of the demultiplexers comprises i switching devices that are coupled to the respective i of the data lines.

13. The display device of claim 12, wherein the i switching devices are sequentially turned on by the i control signals.

14. An organic light emitting display device comprising:

a demultiplexer controller for sequentially supplying i (i is a natural number greater than 2) control signals during respective first periods of a plurality of horizontal periods and before respective second periods of the horizontal periods;

a plurality of scan lines for transferring a plurality of scan signals;

a scan driving unit for supplying the scan signals to the scan lines during the respective second periods of the horizontal periods;

a plurality of output lines for transferring a plurality of data signals;

a data driving unit for sequentially supplying i of the data signals to respective output lines during the first periods;

a plurality of data lines for transferring the data signals;

a plurality of demultiplexers coupled to the respective output lines, for delivering the i of the data signals to a respective i of the data lines in response to the i control signals;

an initializing unit coupled to the data lines and an initial power source, for supplying a voltage of the initial power source to the data lines during respective third sub-periods of the second periods; and a plurality of pixels located at crossing regions of the scan lines and the data lines, each of the pixels configured to be driven during one of the horizontal periods by receiving one of the data signals and one of the scan signals during one of respective second sub-periods of the second periods, and by receiving the voltage of the initial power source during one of the third sub-periods.

* * * * *